UNITED STATES PATENT OFFICE.

JUSTUS WOLFF, OF UNION, NEW JERSEY, ASSIGNOR OF THREE-FOURTHS TO SARAH B. FOLKERS, OF BROOKLYN, NEW YORK.

COMPOSITION FOR MAKING CEMENT.

SPECIFICATION forming part of Letters Patent No. 383,932, dated June 5, 1888.

Application filed March 7, 1887. Serial No. 229,994. (No specimens.)

*To all whom it may concern:*

Be it known that I, JUSTUS WOLFF, of the town of Union, in the county of Hudson and State of New Jersey, have invented certain new and useful Improvements in Building Materials, of which the following is a specification.

This invention relates to an improved building material which is used in making mortar for uniting bricks or blocks of natural or artificial stone and for making plaster, &c.

It consists in a mixture of dry or wet slaked lime or calcium hydrate with crude basic slag from iron-furnaces in a powdered state or broken into small lumps, which slaked lime and powdered slag are mixed with finely-powdered coal-ashes in suitable proportions, which have to be altered according to the quality and condition of the crude slag, lime, and other materials composing the composition.

The following proportions of my improved building material have given good results: sixty parts of crude slag, powdered, twenty-five parts of finely-sifted coal-ashes, and ten to fifteen parts of dry-slaked lime. The dry-slaked lime used may be slaked by exposure to air, but protected against rain or snow, or by water, but when used should be dry.

My improved building material is mixed with sand and water (in the usual manner) to form a mortar, which is used in the usual manner for uniting bricks, natural or artificial stone, as plaster for covering walls, and for like purposes. It will set in a day or two. In about eight or ten days it will resist any amount of water without dissolving, and hardens after several weeks.

The improved building material may be mixed about from two to four times (more or less) of its weight with sand, and forms a mortar which, when set, is much harder and more binding and durable than the mortar made of lime and sand.

Having thus described my invention, I claim as new and desire to secure by Letters Patent—

A building material consisting of a mixture of dry powdered slag, dry powdered slaked lime, and coal-ashes, substantially as set forth.

In testimony that I claim the foregoing as my invention I have signed my name in presence of two subscribing witnesses.

JUSTUS WOLFF.

Witnesses:
OSCAR F. GUNZ,
CARL KARP.